United States Patent
Shin

(10) Patent No.: US 9,268,026 B2
(45) Date of Patent: Feb. 23, 2016

(54) METHOD AND APPARATUS FOR LOCATION POSITIONING IN ELECTRONIC DEVICE

(71) Applicant: Samsung Electronics Co., Ltd., Gyeonggi-do (KR)

(72) Inventor: Gye-Joong Shin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 411 days.

(21) Appl. No.: 13/766,039

(22) Filed: Feb. 13, 2013

(65) Prior Publication Data

US 2013/0214967 A1    Aug. 22, 2013

(30) Foreign Application Priority Data

Feb. 17, 2012 (KR) .......................... 10-2012-0016415
Jan. 30, 2013 (KR) .......................... 10-2013-0010350

(51) Int. Cl.
G01S 19/47 (2010.01)
G01S 19/34 (2010.01)
G01S 19/42 (2010.01)

(52) U.S. Cl.
CPC .................. *G01S 19/47* (2013.01); *G01S 19/34* (2013.01); *G01S 19/425* (2013.01)

(58) Field of Classification Search
CPC .......... G01S 19/09; G01S 19/47; G01S 19/49
USPC .................... 342/357.2, 357.3, 357.32, 357.4, 342/357.74; 701/499, 500
See application file for complete search history.

(56) References Cited

U.S. PATENT DOCUMENTS

| | | | |
|---|---|---|---|
| 5,293,318 | A | 3/1994 | Fukushima |
| 2005/0071175 | A1 | 3/2005 | Gila et al. |
| 2005/0113124 | A1 | 5/2005 | Syrjarinne et al. |
| 2008/0082265 | A1 | 4/2008 | Chen et al. |
| 2010/0109945 | A1 | 5/2010 | Roh |
| 2010/0159947 | A1 | 6/2010 | Imafuku |
| 2015/0046734 | A1 | 2/2015 | Kabasawa et al. |

FOREIGN PATENT DOCUMENTS

| | | | |
|---|---|---|---|
| CN | 1575481 | A | 2/2005 |
| CN | 101109795 | A | 1/2008 |
| CN | 101554836 | A | 10/2009 |
| CN | 101578571 | A | 11/2009 |
| CN | 101858980 | A | 10/2010 |
| JP | 5-18771 | A | 1/1993 |

(Continued)

*Primary Examiner* — Dao Phan
(74) *Attorney, Agent, or Firm* — Cha & Reiter, LLC.

(57) ABSTRACT

A positioning method and apparatus of an electronic device which comprises a Global Navigation Satellite System (GNSS) or Global Positioning System (GPS), and an Inertial Navigation System (INS), includes receiving a satellite signal through the GNSS. A location of the electronic device and a reliability of location information of the electronic device is determined based on the satellite signal provided by the GNSS using at least one of satellite information of the satellite signal and location information based on the determined location of the electronic device. An operational level of the INS is determined using the reliability of the location information of the electronic device; and compensating the location of the electronic device by operating the INS according to the determined operational level of the INS.

22 Claims, 5 Drawing Sheets

(56) References Cited

FOREIGN PATENT DOCUMENTS

| | | |
|---|---|---|
| JP | 5-19036 A | 1/1993 |
| JP | 9-113293 A | 5/1997 |
| JP | 2002-49997 A | 2/2002 |
| JP | 2009-216484 A | 9/2009 |
| JP | 2009-294000 A | 12/2009 |
| JP | 2010-151459 A | 7/2010 |
| JP | 2011-097278 A | 5/2011 |
| JP | 2012-2678 A | 1/2012 |
| KR | 10-2001-0113370 A | 12/2001 |
| KR | 10-0354925 B1 | 9/2002 |
| KR | 10-2006-0066920 A | 6/2006 |
| KR | 10-2006-0074100 A | 7/2006 |
| KR | 10-2011-0009431 A | 1/2011 |

METHOD AND APPARATUS FOR LOCATION POSITIONING IN ELECTRONIC DEVICE

CLAIM OF PRIORITY

The present application claims the benefit of priority under 35 U.S.C. §119(a) to a Korean patent application filed in the Korean Intellectual Property Office on Feb. 17, 2012 and Jan. 30, 2013, and assigned Serial Nos. 10-2012-0016415 and 10-2013-0010350, the entire disclosure of each of which is hereby incorporated by reference.

BACKGROUND OF THE INVENTION

1. Field of the Invention

The present invention relates generally to location positioning. More particularly, the present invention relates to a method and an apparatus for efficiently controlling operation and power of a sensor in a positioning system that combines Global Navigation Satellite System (GNSS) or Global Positioning System (GPS) with an Inertial Navigation System (INS).

2. Description of the Related Art

In accordance with recent advances of mobile communication technologies, location positioning techniques have been developed to provide a new service based on locating a user. In general, the service using the location information is referred to as a Location Based Service (LBS).

Conventional location information acquisition methods typically include a method of location utilizing a Global Navigation Satellite System (GNSS), and/or a method of location that combines the GNSS and an Inertial Navigation System (INS).

The GNSS estimates the location based on a distance between a satellite and a receiver by measuring a time difference of received satellite signals. There is a problem in that the GNSS may not be able to measure the location because the signal is interrupted in a shadow zone (e.g., in buildings, under tall trees along the street, in a tunnel, and in the house). To avoid this, the INS operates based on the GNSS, particularly in those instances where the GNSS is unable to measure the location.

The INS estimates the relative location information by analyzing movement component and status information of a moving object using inertial sensors (e.g., accelerometer, gyroscope, and altimeter) and additional sensors (such as terrestrial magnetism sensor). Namely, the INS determines a location, a speed, and a direction of an object with respect to a known start point by measuring acceleration and angular velocity of the object and continually integrating them over time. Herein, the relative location information indicates a current location of the object measured by integrating the speed over time based on the start point.

The conventional system combining the GNSS and the INS enhances the overall location detection or expands the measurement range by adequately combining the relative location information from the GNSS and the location information from the INS.

However, even when the location information provided from the GNSS is accurate enough to offset the combination with the INS information, the system combining the GNSS and the INS continuously operates the INS, thus unnecessarily consuming power and degrading the overall system performance of the mobile device, such as a portable terminal.

For example, in an outdoor environment such as highway without a tall object, such as building or tree, around the user, the GPS location can be accurately demodulated because the GPS satellite signal is not subject to interference or multipath. Accordingly, the GNSS alone can achieve the accurate location estimation in this situation. However, the positioning system combining the GNSS and the INS integrates the GNSS and the INS does not take into consideration such a situation.

SUMMARY OF THE INVENTION

In order to address the above-discussed deficiencies of the conventional combination of GNSS and INS, an exemplary aspect of the present invention provides a method and an apparatus for controlling an INS according to reliability of location and satellite information of a GNSS in a positioning system combining the GNSS and the INS.

Another exemplary aspect of the present invention is to provide a method and an apparatus for reducing unnecessary power consumption by efficiently controlling sensor devices used for INS in a positioning system combining a GNSS and the INS.

Yet another exemplary aspect of the present invention provides a method and an apparatus for reducing power consumption by controlling INS according to reliability of location and satellite information of a GNSS in a portable terminal including a positioning apparatus combining the GNSS and the INS Still another exemplary aspect of the present invention provides a method and an apparatus for a Location Based Service (LBS) that utilizes a positioning system combining a GNSS and an INS in a way unknown heretofore.

According to another exemplary aspect of the present invention, a positioning method of an electronic device which comprises a Global Navigation Satellite System (GNSS) or Global Positioning System (GPS), and an Inertial Navigation System (INS), includes receiving a satellite signal through the GNSS; determining a location of the electronic device based on the satellite signal; determining a reliability of location information of the electronic device provided by the GNSS using at least one of satellite information of the satellite signal and location information based on the determined location of the electronic device; determining an operational level of the INS using the reliability of the location information of the electronic device; and compensating the location of the electronic device by operating the INS according to the determined operational level of the INS.

According to still another exemplary aspect of the present invention, a positioning apparatus which comprises a GNSS or GPS, and an INS, includes the GNSS for receiving a satellite signal and determining a location of an electronic device based on the satellite signal; a GNSS information analyzer for determining a reliability of location information provided by the GNSS using at least one of satellite information of the satellite signal and location information based on the determined location of the electronic device; an INS combination determiner for determining an operational level of the INS using the reliability of the location information of the electronic device; and a sensor information receiver for compensating the location of the electronic device by operating the INS according to the determined operational level of the INS.

According to yet another exemplary aspect of the present invention, an electronic device includes a GNSS or GPS; an INS; one or more processors; a memory; and one or more programs stored in the memory and executed by the one or more processors. The program includes an instruction for receiving a satellite signal through the GNSS, determining a location of the electronic device based on the satellite signal, determining a reliability of location information of the electronic device provided by the GNSS using at least one of satellite information of the satellite signal and location information based on the determined location of the electronic device, determining an operational level of the INS using the reliability of the location information of the electronic device, and compensating the location of the electronic device by operating the INS according to the determined operational level of the INS.

In an exemplary embodiment of the present invention, the program comprises an instruction for determining a first reliability by considering at least one of a number of visible satellites in the satellite information, a number of satellites used to locate the electronic device, a satellite signal receive strength, and satellite deployment information, determining a second reliability by considering a velocity and a velocity change of the electronic device in the location information, determining a third reliability by considering error information of the location of the electronic device in the location information, determining a fourth reliability by considering a latitude, a longitude, an altitude, and changes of the latitude, the longitude, the altitude of the electronic device in the location information, and determining a fifth reliability by combining at least one of the first reliability, the second reliability, the third reliability, and the fourth reliability.

In an exemplary embodiment of the present invention, the location information comprises at least one of a longitude, a latitude, an altitude, a movement direction, and a speed of the electronic device, and the satellite information comprises at least one of a number of visible satellites, a satellite list used for the positioning, a satellite signal receive strength, satellite deployment information, Dilution of Precision (DOP) information indicating uniformity of the satellite deployment, and uncertainty or accuracy.

In an exemplary embodiment of the present invention, the program determines a corresponding operational level of the INS by comparing the reliability of the location information of the GNSS and at least one threshold.

In an exemplary embodiment of the present invention, the operational level of the INS is divided into a plurality of operational levels based on at least one of a turning on/off status of a plurality of sensors of the INS and a sampling cycle of the sensors.

In an exemplary embodiment of the present invention, the operational level of the INS comprises a first level for turning off a sensor of the INS; a second level for determining stop and movement; a third level for determining rotation; a fourth level for determining a rotation angle; and a fifth level for determining the location information based on the INS.

In an exemplary embodiment of the present invention, the program determines third location data by combining first location data of the GNSS and second location data of the INS, and determines the location of the electronic device based on the third location data.

Other exemplary aspects, advantages, and salient features of the present invention will become better understood by those skilled in the art from the following detailed description, which, taken in conjunction with the annexed drawings, discloses exemplary embodiments of the invention.

BRIEF DESCRIPTION OF THE DRAWINGS

The above and other exemplary aspects, features, and advantages of certain exemplary embodiments of the present invention will become more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist a person of ordinary skill in the art with a comprehensive understanding of exemplary embodiments of the invention as defined by the claims and their equivalents. The description includes various specific details to assist the person of ordinary skill in the art with that understanding but, such specific details are to be regarded as merely exemplary for illustrative purposes, and not to limit the scope of the presently claimed invention. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness when their inclusion could obscure appreciation of the subject matter of the present invention by a person of ordinary skill in the art.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustrative purposes only and not for the purpose of limiting the invention as defined by the appended claims and their equivalents.

Also, it is to be understood that the singular forms "a," "an," and "the" include plural references unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for controlling an operational level of an Inertial Navigation System (INS) according to the reliability of location information of a Global Navigation Satellite System (GNSS) in a positioning system combining the GNSS and the INS.

Hereinafter, an electronic device includes the GNSS and the INS, and measures the position by combining the GNSS and the INS.

Figure 1:
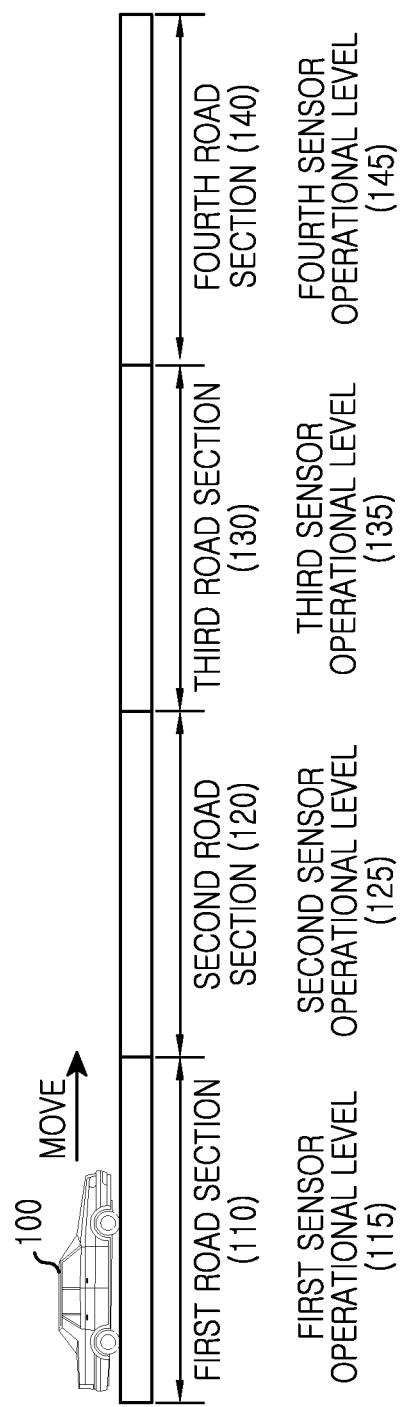
FIG. 1 illustrates operational levels of an INS according to a reliability of location information of a GNSS according to an exemplary embodiment of the present invention.

FIG. 1 depicts a scenario for determining an operational level of the INS according to a reliability of location information of the GNSS according to an exemplary embodiment of the present invention. First of all, it is assumed that, when a user living out of town goes to the office in downtown, the user moves along an outer perimeter expressway (a first road)→an underground tunnel to downtown (a second road)→an arterial road in a built-up area (a third road)→a service road near the office (a fourth road) by car 100.

Referring to FIG. 1, with a number of visible satellites and a number of satellites used to determine the position and a slight change of a velocity of the car 100 (or the electronic device) in a first road section 110, the GNSS of the electronic device provides location information of good quality. Hence, the INS is not used for the positioning of the electronic device. In other words, since the reliability of the location information provided from the GNSS on the expressway is high, a sensor operational level (hereafter, referred to as a first sensor operational level 115) of the INS is turned off. That is, the first sensor operational level 115 implies that all of sensors of the INS are turned off.

As a Global Positioning System (GPS) signal is not received in the tunnel of a second road section 120, the quality reliability of the location information provided from the GNSS is quite low (hereafter, referred to as a second sensor operational level 125). Hence, the INS works at the second sensor operational level 125 in the tunnel. The second sensor operational level 125 implies that all of the sensors of the INS are turned on. That is, the electronic device estimates the location merely using the INS, without using the GNSS. Alternatively, using sensor data of the INS detected at the second sensor operational level 125, a location estimation error of the GNSS may be corrected.

In a third road section 130 in between the first road and the fourth road, the quality of the location information provided from the GNSS of the electronic device is intermittently low. When the car 100 runs on the third road section 130, the reliability of the GNSS is a middle level and only some sensors of the INS operate (hereafter, referred to as a third sensor operational level 135). That is, the third sensor operational level 135 implies that sensors for determining the stop or the movement of the car 100 operate.

In a fourth road section 140, the quality of the location information provided from the GNSS is low because of densely sited buildings, the reliability of the location information provided from the GNSS when the car 100 runs on the fourth road section 140 is lower than the reliability of the location information provided from the GNSS of the third road section 130, and sensors for determining an approximate rotation angle of the car 100 are operated (hereafter, referred to as a fourth sensor operational level 145). That is, the fourth sensor operational level 145 operates the sensors for determining the approximate rotation angle when the car 100 runs.

Although the operational level of the INS is divided into, but not limited to, the first sensor operational level 115, the second sensor operational level 125, the third sensor operational level 135, and the fourth sensor operational level 145 according to the reliability of the location information provided from the GNSS in FIG. 1, the operational level can be divided into more levels.

Figure 3:
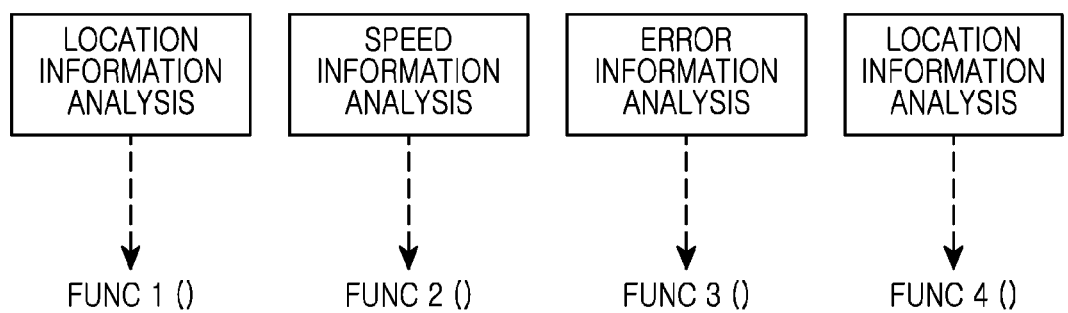
FIG. 3 illustrates a block diagram of an electronic device for controlling the INS according to the reliability of the location information of the GNSS according to an exemplary embodiment of the present invention.

The reliability determination of the location information provided from the GNSS is elucidated by referring to FIG. 3.

Figure 2:
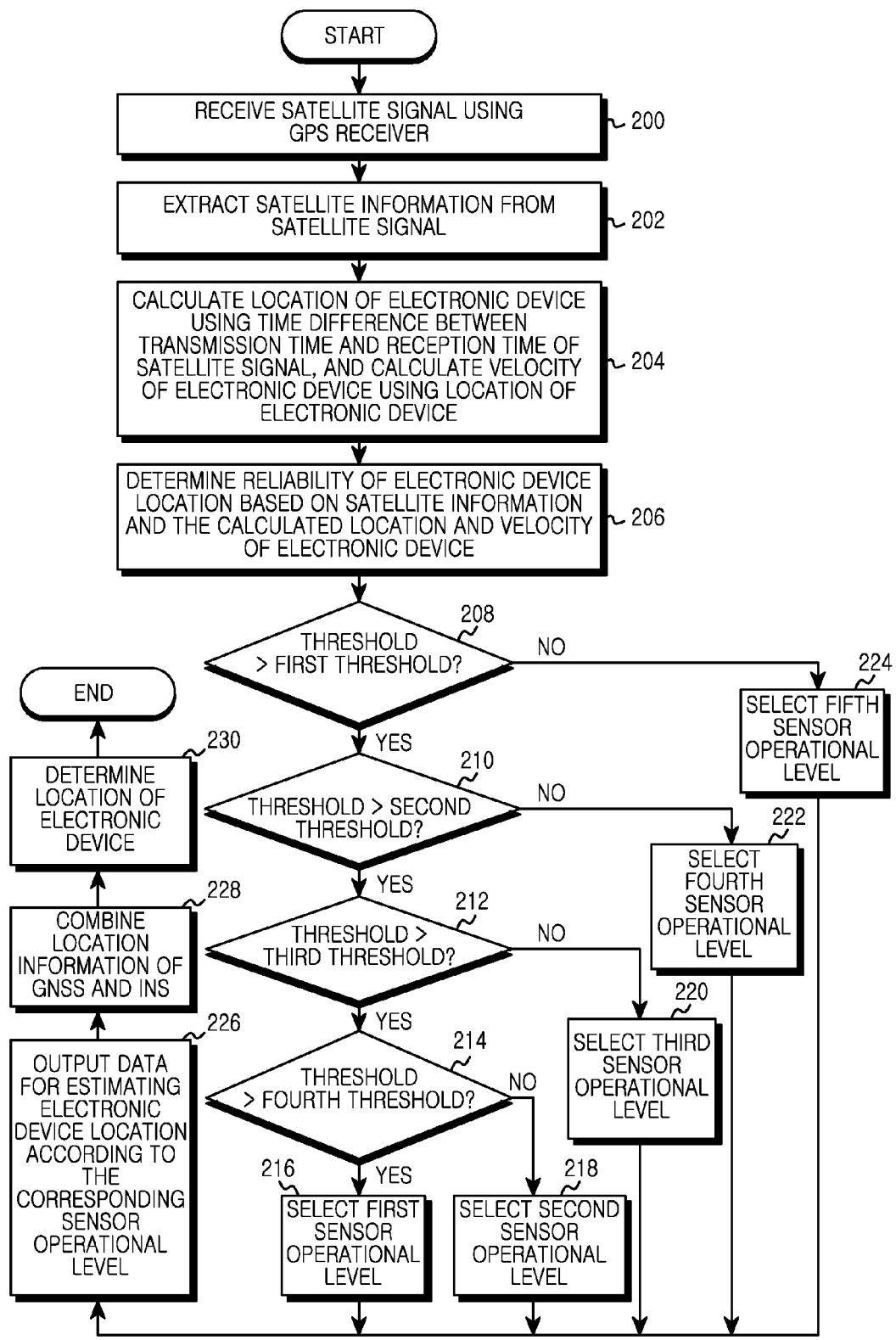
FIG. 2 is a flowchart illustrating a method for controlling the operational level of the INS according to the reliability of location information of the GNSS according to an exemplary embodiment of the present invention.

FIG. 2 is a flowchart of a method for controlling the operational level of an INS according to reliability of location information of a GNSS according to an exemplary embodiment of the present invention. However, the artisan should understand and appreciate that GPS or some other satellite positioning system can be used wherever it states GNSS.

Referring now to FIG. 2, at step 200, a positioning system receives a satellite signal through the GNSS.

At step 202, the positioning system extracts satellite information in the satellite signal. The satellite information can include a date, a time, uncertainty or accuracy, Dilution of Precision (DOP), the number of current visible satellites, a satellite signal receive strength, and satellite list information used for the positioning. The DOP is information indicating uniformity of the satellite deployment, and the uncertainty or accuracy indicates an error range of the location information. The visible satellite indicates a satellite received at a GPS receiver. In various implementations, some satellite information such as number of visible satellites, uncertainty or accuracy, and DOP may be calculated and obtained by the electronic device.

At step 204, the positioning system may calculate a distance between the satellite and the positioning system using a time difference between a transmission time and an arrival time of the satellite signal normally received, and calculate the location (e.g., latitude, longitude, and altitude) of the positioning system (or the electronic device including the positioning system) using triangulation. Based on the location of the electronic device, the velocity of the electronic device can be calculated. The velocity includes the direction and the speed of the electronic device. Hereafter, the velocity and the location of the electronic device are referred to as location information.

Next at step 206, the positioning system determines the reliability of the location information of the electronic device provided from the GNSS based on the received satellite information and the calculated location information.

For example, in order to determine the reliability of the location information provided from the GNSS, the positioning system determines the reliability of the location information provided from the GNS by tracking speed change of the electronic device, location (latitude, longitude, and altitude) change of the electronic device, direction change of the electronic device, and error level information (e.g., uncertainty or accuracy and DOP), and combining the number of the current visible satellites, the satellite signal receive strength, and the satellite list information used for the positioning.

In so doing, the reliability of the GNSS can be calculated by taking into consideration either the location information or the satellite information, or both the location information and the satellite information. The reliability calculation of the location information of the GNSS shall be explained with reference to FIG. 3.

Next, the positioning system compares the calculated reliability and thresholds (a first threshold<a second threshold<a third threshold<a fourth threshold) and determines the corresponding one of the INS operational levels based on the comparison. The number of the thresholds compared is related to the number of the operational levels of the INS. While the number of the operational levels of the INS is, but not limited to, 5 in FIG. 2, the operational level of the INS can be subdivided into five or more operational levels. The INS operational levels can be divided into first through fifth sensor operational levels based on a sampling cycle and an on/off status of the inertial sensors (e.g., accelerometer, gyroscope, and altimeter) and the additional sensors (such as terrestrial magnetism sensor). Herein, the first sensor operational level (or "Sensor OFF") indicates that no INS is in use because of the high reliability of the GNSS, the second sensor operational level (or "Low Range") determines only the stop or the movement of the vehicle, the third sensor operational level ("Mid Range") determines whether the running vehicle rotates (more than 30 degrees or so), the fourth sensor operational level ("High Range") determines the approximate rotation angle (about 10 degrees) when the vehicle is in motion, and the fifth sensor operational level ("Full Range") indicates the level allowing the accurate positioning using only the INS. For example, only the sensor for determining the movement is operated in the second sensor operational level (Low Range), only the sensor for determining the rotation is operated in the third sensor operational level (Mid Range), and only the sensor for determining the rotation angle is operated in the fourth sensor operational level (High Range). According to particular implementations, a plurality of operational levels of the INS can be defined by combining the on/off pattern of the inertial sensors with the sampling cycle pattern for processing the detected data. Thus, the operation and the power of the inertial sensors can be controlled.

When the reliability of the location information of the GNSS is greater than the first sensor operational level at step 208, the positioning system goes to step 210. When the reliability is smaller than the first threshold, the positioning system goes to step 224. When the reliability is compared with and greater than the second threshold at step 210, the positioning system goes to step 212. When the reliability is smaller than the second threshold, the positioning system goes to step 222. When the reliability is compared with and greater than the third threshold at step 212, the positioning system goes to step 214. When the reliability is smaller than the third threshold, the positioning system goes to step 220. When the reliability is compared with and greater than the fourth threshold at step 214, the positioning system goes to step 216. When the reliability is smaller than the fourth threshold, the positioning system goes to step 218.

The positioning system selects the first sensor operational level at step 216, selects the second sensor operational level at step 218, selects the third sensor operational level at step 220, selects the fourth sensor operational level at step 222, and selects the fifth sensor operational level at step 224.

At step 226, the positioning system outputs data for the positioning of the electronic device (hereafter, referred to as location data) using the INS according to the corresponding sensor operational level.

With continued reference to FIG. 2, at step 228, the positioning system combines first location data of the GNSS and second location data of the INS.

At step 230, the positioning system corrects the location of the electronic device using the combined data of the first location data of the GNSS and the second location data of the INS.

For example, the location of the electronic device corresponding to the first location information of the GNSS may be corrected using the second location data of the INS, the location of the electronic device corresponding to the second location information of the INS may be corrected using the first location data of the GNSS, and the location of the electronic device may be determined using third location data which combines the first location data and the second location data.

Next, the positioning system finishes this process.

FIG. 3 depicts the reliability determination of the location and satellite information of the GNSS according to an exemplary embodiment of the present invention.

Referring now to FIG. 3, the reliability of the location information provided by the GNSS is determined by analyzing current satellite information and the change of the location information from the information relating to the satellite information, and multiplying an output value of a first function Func 1( ) based on the analysis by a weight a, analyzing speed information and its speed change of the location information and multiplying an output value of a second function Func 2 ( ) based on the analysis by a weight b, analyzing error information and its error change of the location information and multiplying an output value of a third function Func 3( ) based on the analysis by a weight c, and analyzing current location information and its information change of the location information and multiplying an output value of a fourth function Func 4 ( ) based on the analysis by a weight d, and then adding up all of the products.

For example, the first function Func 1( ) uses previous satellite information and current satellite information to analyze the satellite information, and utilizes the change of the satellite information. The satellite information includes the number and the list of the visible satellites, the satellite signal receive strength from the satellites, deployment information (azimuth and elevation) of the satellites, and the number and the list of the satellites used for the positioning. The satellite information analysis is described in brief. In an environment such as expressway out of town (e.g., the first road section 110 of FIG. 1), the number of the current visible satellites is 10, the number of the satellites used for the positioning is 6, the receive strength of each satellite signal exceeds 35 dB, and the satellites are spatially placed widely. When this satellite information is compared with and equal to the previous satellite information, the analysis result value is 90/100. By contrast, in a downtown environment (e.g., the second road section 120 of FIG. 1) with the densely sited skyscrapers, the number of the current visible satellites is 4, the number of the satellites used for the positioning is 3, the satellite signal receive strength is below 30 dB, and the satellites are spatially placed narrowly. When this satellite information is compared with and lower than the previous satellite information, the analysis result value is 20/100. When the satellite information is not received, the analysis result value is 0/100.

The second function Func 2( ) uses the previous satellite information and the current satellite information to analyze the velocity information, and utilizes the change of the velocity information in the individual location information. The velocity information includes speed information and direction information. Due to characteristics of the GNSS, there is a relatively great error between the fast speed (e.g., 60 Km/H) like a vehicle running on the road out of town and the slow speed (e.g., 20 Km/H) like the movement in a huge traffic jam in the town. Thus, the effect of the INS is increased. The velocity information analysis is described now in brief. When the current speed information is over 60 Km/H and the change is within 10 Km/H in comparison with the previous velocity information, the analysis result value is 90/100. By contrast, when the current speed information is about 20 Km/H and the change gets small in comparison with the previous velocity information, the analysis result value is 20/100. When no velocity information is received or the speed information is below 5 Km/H, the analysis result value is 0/100.

The third function Func 3( ) uses the previous location information and the current location information to analyze the error information, and utilizes the change of the error information in the individual location information. Representative error information provided from the GNSS includes DOP information indicating the uniformity of the satellite deployment, and the uncertainty or accuracy. The location information is quite excellent when the DOP value is smaller than 2, the location information is good when the DOP value is 2~3, the location information is normal when the DOP value is 4~5, and the location information is useless when the DOP value is over 6. The uncertainty or accuracy indicates the error range of the location information, and is represented based on meter. The error information analysis is described now in brief. When the current DOP value is 3, the uncertainty or accuracy is 10 m, and the current error information is equal to the previous error information, the analysis result value is 90/100. By contrast, when the current DOP value is 5, the uncertainty or accuracy is about 30 m, and the current error information is higher than the previous error information, the analysis result value is 20/100. When no error information is received or the DOP is over 6, the analysis result value is 0/100.

The fourth function Func 4( ) uses the previous location information and the current location information to analyze the location information, and utilizes the changes of the latitude, the longitude, and the altitude in the individual location information. The latitude, longitude, and altitude change (a first differential value) in the user's daily life varies according to diverse transportations such as airplane, vehicle, ship, and walk, whereas the change of the latitude, longitude, and altitude change (a second differential value) falls within a range close to zero. The location information analysis is described now in brief. When the current latitude, longitude, and altitude are compared with the previous latitude, longitude, and altitude and the second differential value lies within +/−5, the analysis result value is 90/100. By contrast, when the second differential value is within +/−10, the analysis result value is 20/100. When the latitude, the longitude, and the altitude are not received, the analysis result value is 0/100.

A weight applied to each function can vary according to the system, and its fine adjustment may be required through trial and error in order to obtain a value optimized for the system.

In the implementations of reliability determinations as discussed hereinabove, the function for calculating the reliability can be variously defined by subdividing the information of the location information and the satellite information and applying different weights to the subdivided information.

Figure 4:
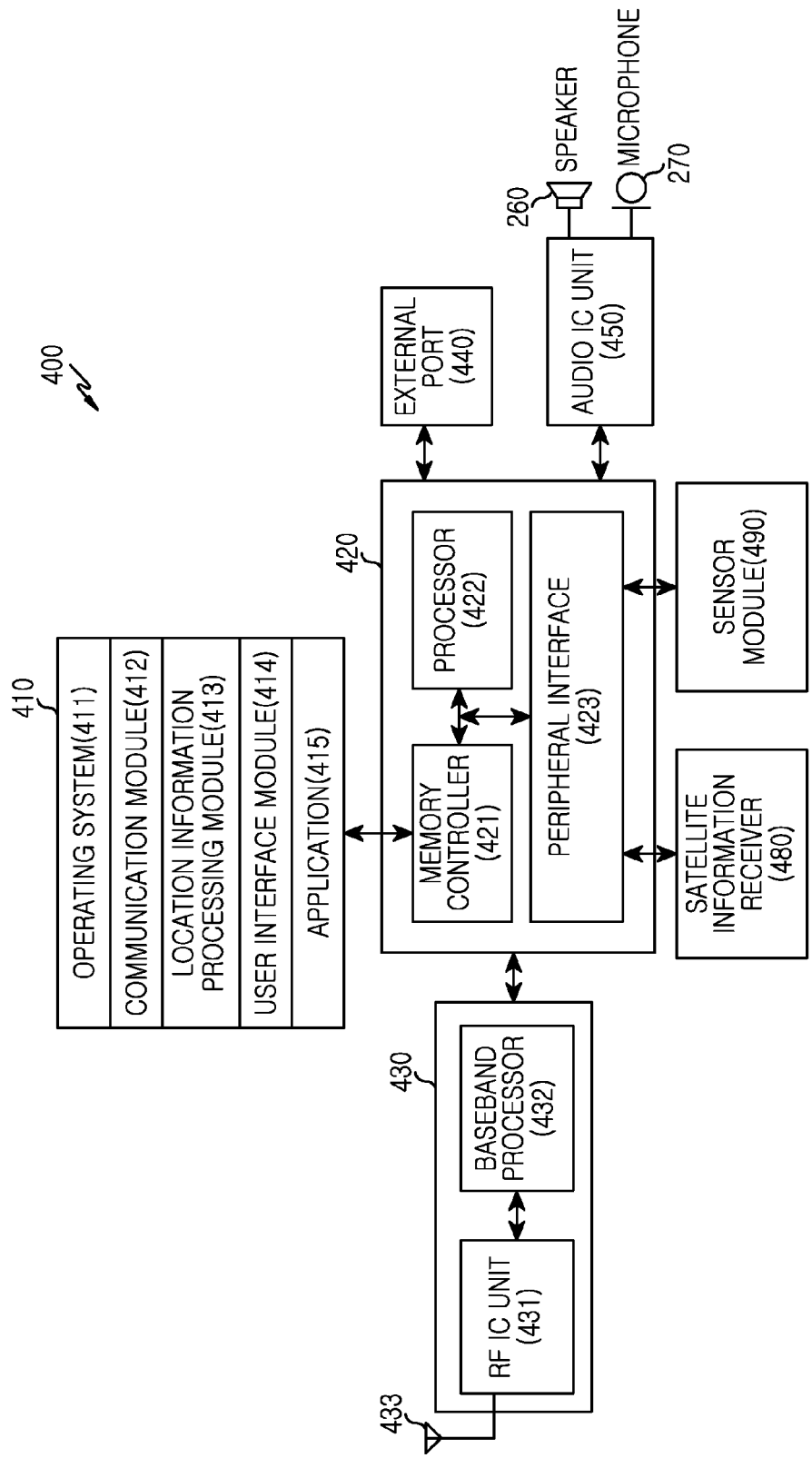
FIG. 4 illustrates a determination of the reliability of the location information of the GNSS according to an exemplary embodiment of the present invention.

FIG. 4 depicts a portable electronic device according to an exemplary embodiment of the present invention.

The portable electronic device 400 is typically a device such as portable terminal, mobile phone, mobile pad, media player, tablet computer, handheld computer, or Personal Digital Assistant (PDA), just to name a few non-limiting possibilities. The portable electronic device 400 may combine two or more functions of those devices.

The portable electronic device 400 preferably includes a memory 410, a processor unit 420, a communication unit 430, an external port 440, an audio Integrated Circuit (IC) unit 450, a speaker 460, a microphone 470, a location information receiver 480, and a sensor module 490. A plurality of the memories 410 and a plurality of the external ports 440 can be employed.

Herein, the processor unit 420 includes a memory controller 421, a processor or microprocessor (Central Processing Unit (CPU)) 422, and a peripheral interface 423. Herein, one or more processors can be configured for various operations. The communication unit 430 preferably includes a baseband processor 432 and a Radio Frequency (RF) IC unit 431.

The configuration elements communicate with each other through one or more communication buses or signal lines (not shown).

The configuration elements can be realized using hardware such as one or more ICs, or software loaded into a processor and executed or in combination.

The portable electronic device 400 of FIG. 4 is an example provided for illustrative purposes, but there are many different arrangements within the spirit of the invention and the scope of the appended claims that can be practiced by the artisan. The portable electronic device 400 can include more or less components than depicted in the drawing. The portable electronic device 400 can be configured differently from FIG. 4.

The configuration elements of the portable electronic device 400 are explained now.

For example, the memory 410 preferably includes a random access memory, a non-volatile memory including a flash memory, a Read Only Memory (ROM), an Electrically Erasable Programmable ROM (EEPROM), a magnetic disc storage device, a Compact Disc ROM (CD-ROM), Digital Versatile Discs (DVDs) or other optical storage devices, and/or a magnetic cassette, just to name some possible variations. Alternatively, the memory 410 may combine part or all of those recording media. A plurality of memories may be equipped, but the artisan appreciates that the memory is statutory non-transitory memory.

The portable electronic device 400 may further include an attachable storage device accessible via the communication network such as Internet, Intranet, Local Area Network (LAN), Wide LAN (WLAN), or Storage Area Network (SAN), or a communication network by combining the networks. The storage device can access the portable electronic device 400 through the external port 440, which in a non-limiting example, might be a mini or micro-USB, micro-Firewire, or other type of port. A separate storage device on the communication network may access the portable electronic device 400 through the RF IC unit 431.

The memory 410 stores software. Software components include an operating system software 411, a communication software module 412, a location information processing module 413, a user interface software module 414, and one or more application software 415. Herein, the software can be referred to as the operating system or the communication module. The software module can be referred to as an executable instruction set.

The operating system software 411 (the embedded operating system such as, for example, WINDOWS, LINUX, Darwin, RTXC, UNIX, OS X, or VxWorks) includes various software components for controlling the general system operation. The general system control indicates, for example, memory management and control, storage hardware (device) control and management, and power control and management. The operating system software 411 processes the normal communication between the various hardware devices and other software components.

The communication software module 412 includes various software components for processing data transmission and reception through the RF IC unit 431 or the external port 440.

The location information processing module 413 includes various software components for controlling the INS according to the reliability of the location and satellite information of the GNSS. For example, the location information processing module 413 includes software components configured for controlling the positioning apparatus of FIG. 2.

The user interface module 414 includes various software components relating to a user interface. The user interface module 414 is involved in the status change of the user interface and the condition of the user interface status change.

The application software 415 includes browser, e-mail, instant message, word processing, keyboard emulation, address book, touch list, widget, JAVA-enabled application, coding, Digital Right Management (DRM), voice recognition, voice reproduction, position determining function, location based service, and music player.

When the other element such as processor 422 or peripheral interface 423 of the processor unit 420 accesses the memory 410 through the memory controller 421, the processor 422 controls. The processor 422 executes the software module in the memory 410. The processor 422 manages overall control function of the portable electronic device 400. The processor 422 may include the memory controller function. In some cases, the whole processor unit 420 may be referred to as a processor. The processor 422 controls the INS according to the reliability of the location information and the satellite information of the GNSS of FIG. 1.

The external port 440 indicates, for example, but not limited to, a Universal Serial Bus (USB) port or a FIREWIRE port. The external port 440 is used to connect the portable electronic device 400 to other electronic devices directly or indirectly over the network (e.g., Ethernet, Internet, Intranet, and wireless LAN, just to name a few possibilities).

With continued reference to FIG. 4, the peripheral interface 423 connects an input/output peripheral device of the portable electronic device 400 to the processor 422 and the memory 410 under the control of the memory controller 421. The portable electronic device 400 can include a plurality of processors 422.

The processor 422 executes various functions for the portable electronic device 400 by executing various software programs therein, and processes and controls voice communication and data communication. In addition to those typical functions, the processor 422 may execute a particular software module (instruction set) stored to the memory 410 and conduct various particular functions corresponding to the module.

The processor 422, the peripheral interface 423, and the memory controller 421 may be implemented using a single semiconductor chip. Herein, this single chip is referred to as the processor unit 420. Those configuration elements can be realized as separate semiconductor chips, rather than the single semiconductor chip.

In addition, the communication unit 430 preferably includes the RF IC unit 431 and the baseband processor 432. The RF IC unit 431 transmits and receives radio waves. The RF IC unit 431 converts the baseband signal fed from the baseband processor 432 to the radio wave and transmits the radio wave over an antenna (not shown). The RF IC unit 431 converts and provides the radio wave received over the antenna to the baseband processor 432. The RF IC unit 413 includes an RF transceiver, an amplifier, a tuner, an oscillator, a digital signal processor, a COding DECoding (CODEC) chip set, and a Subscriber Identity Module (SIM) card, which are not shown in the drawing.

Moreover, the RF IC unit 431 communicates with the communication network and other communication device using the radio waves. For example, the RF IC unit 431 can communicate with the Internet, an Intranet, a network, a cellular telephone network, and a wireless network such as wireless LAN or wireless Metropolitan Area Network (MAN). Using the wireless communication, the RF IC unit 431 can communicate with other electronic device.

The wireless communication indicates, but not limited to, Time Division Multiple Access (TDMA), Global System for Mobile Communication (GSM), Enhanced Data GSM Environment (EDGE), Code Division Multiple Access (CDMA), Wideband Code Division Multiple Access (W-CDMA), Orthogonal Frequency Division Multiple Access (OFDMA), Bluetooth, Near Field Communication (NFC), infrared communication, Voice over Internet Protocol (VoIP), Wireless Fidelity (Wi-Fi), Wi-MAX, and a protocol for e-mail, instant messaging, or Short Message Service (SMS), alone or in combination.

In this exemplary embodiment, the RF IC unit 431 frequency-converts the RF signal received over the antenna (not shown) and provides the converted signal to the baseband processor 432, and frequency-converts the baseband signal output from the baseband processor 432 and transmits the converted signal over the antenna. For example, in a non-limiting example, in the transmission according to the CDMA, the baseband processor 432 channel-codes and spreads the data to transmit. In the reception, the baseband processor 432 de-spreads and channel-decodes the received signal. However, an artisan appreciates that the presently claimed invention is not limited to spread spectrum forms of transmission.

The audio IC unit 450 provides an audio interface between the user and the portable electronic device 400 together with the speaker 460 and the microphone 470. More particularly, the audio IC unit 450 communicates with the user through the speaker 460 and the microphone 470. The audio IC unit 450 receives the data signal through the peripheral interface 423 of the processor unit 420 and converts the received data signal to an electric signal. The converted electric signal is output to the speaker 460. The speaker 460 converts the electric signal to a sound wave audible by the user. The microphone 470 converts the sound wave fed from the user or other sound sources to electric signals. The audio IC unit 450 receives the converted electric signal from the microphone 470. The audio IC unit 450 converts the received electric signal to an audio data signal and sends the converted audio data signal to the peripheral interface 423. The audio data is output to the memory 410 or the communication unit 430 through the peripheral interface 423. The audio IC unit 450 can include an attachable and detachable ear phone, head phone, or head set. The head set can offer both of the output function (single-earpiece or double-earpiece headphone) and the input function. The audio IC unit 450 can include a jack (not shown) for providing the interface with the ear phone, the head phone, or the head set. The jack may be referred to as an earphone jack or a headset jack.

The satellite information receiver 480 locates the user by receiving the GPS satellite signal through a GPS reception module and provides the result to the processor 422 via the peripheral interface 423.

The sensor module 490 obtains acceleration, velocity, and direction information (simply referred to as sensor data) by detecting signals through the inertial sensors (e.g., accelerometer, gyroscope, and altimeter) and the additional sensors (such as terrestrial magnetism sensor), and provides the result to the processor 422 via the peripheral interface 423.

With continued reference to FIG. 4, the portable electronic device 400 preferably includes a power system (not shown) for receiving and supplying power to its elements. The power system can include a power source (AC power supply or battery), a power error detection circuit, a power converter, a power inverter, and a charger and/or a power status display device (light emitting diode). The portable electronic device 400 can include a power management and control device for producing, managing, and distributing the power.

Figure 5:
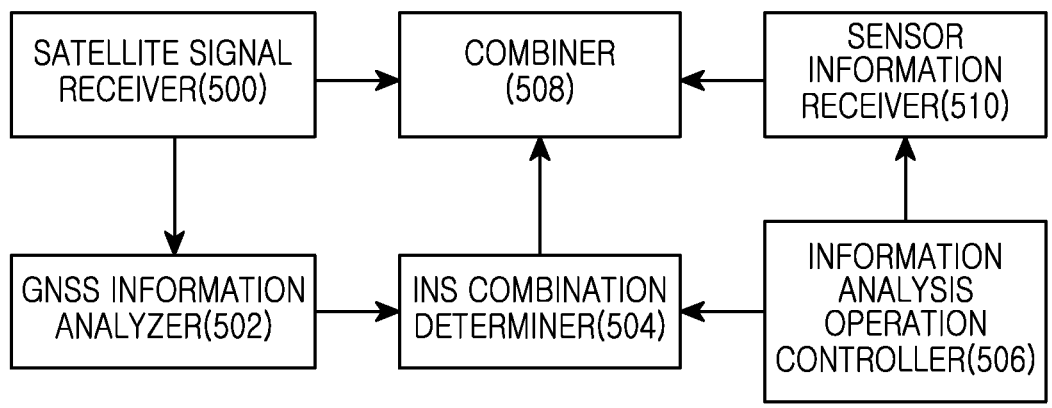
FIG. 5 illustrates a block diagram of a positioning apparatus according to an exemplary embodiment of the present invention.

FIG. 5 is an exemplary block diagram of the positioning apparatus according to an exemplary embodiment of the present invention.

Referring now to FIG. 5, the positioning apparatus in this example preferably includes a satellite signal receiver 500, a GNSS information analyzer 502, an INS combination determiner 504, an INS operation controller 506, a combiner 508, and a sensor information receiver 510. Again it is to be reiterated that other types of satellite based positioning could be used as well and the claimed invention is not limited to the examples shown and described herein.

The satellite signal receiver 500 receives and provides the GPS signal including the satellite information and the location information to the GNSS information analyzer 502.

The GNSS information analyzer 502 calculates the reliability of the location information based on the GNSS by analyzing the current location information and satellite information versus the previous location information and satellite information. By making such calculations, the GNSS information analyzer 502 retains the previous location information and satellite information and tracks their change. The location information for calculating the reliability of the location information based on the GNSS can include the current speed information and speed change, the location (latitude, longitude, and altitude) change, the movement direction change, and the error level information and its change. The satellite information for calculating the reliability of the location information based on the GNSS can include the current number and change of the visible satellites to the GNSS or GPS, the satellite signal receive strength and change, and the satellite list information used for the positioning.

The INS combination determiner 504 determines the operational level of the sensor information receiver 510 by evaluating the reliability of the location information calculated by the GNSS information analyzer 502, more particularly, by comparing the reliability and the threshold. For example, the operation level of the sensor information receiver 510 is divided to Full/High/Mid/Low Range or OFF.

The INS operation controller 506 also controls the sensor information receiver 510 according to the combination level determined by the INS combination determiner 504. For example, for estimating low reliability, the INS operation controller 506 determines low accuracy of the location information of the satellite signal receiver 500 and thus controls to increasingly rely on the estimated relative location by operating the sensor information receiver 510 with the Full Range. "Low reliability" means that a calculated reliability value is less than the threshold, and accuracy of the location information of the satellite signal receiver 500 is low in low reliability environment. Similarly, the INS operation controller 506 can operate at various operational levels. When estimating the high reliability, the INS operation controller 506 controls so as not to operate the sensor information receiver 510.

The combiner 508 combines the location information of the satellite signal receiver 500 and the relative location information estimated by the sensor information receiver 510 according to the combination level determined by the INS combination determiner 504.

Under the control of the INS operation controller 506, the sensor information receiver 510 detects the signal using the inertial sensors (e.g., accelerometer, gyroscope, and altimeter) and the additional sensors (such as terrestrial magnetism sensor), and determines the relative location information by obtaining the acceleration, speed, and direction information (in brief, referred to as the sensor data).

As stated above, the positioning system combining the GNSS and the INS can avoid unnecessary power consumption and ensure the system performance by efficiently controlling the sensor module used for the INS. The reduction of the power consumption is shown in Table 1 with specific examples. The gyroscope alone is used to determine the current reduction effect per operation mode of the sensor module.

TABLE 1

| Sensor OFF | Low Range (10 Hz/ 100 ms) | Mid Range (16 Hz/ 60 ms) | High Range (25 Hz/ 40 ms) | Full Range (50 Hz/ 20 ms) |
|---|---|---|---|---|
| 48.77 mA | 59.53 mA | 61.9 mA | 65.66 mA | 77.56 mA |
| variation | 10.8 mA | 13.1 mA | 16.9 mA | 28.8 mA |
| percentage | 22.1% | 26.9% | 34.7% | 59.1% |

Table 1 shows the current measurement examples in various operation modes of the gyroscope. A far greater effect can be anticipated when the additional sensors (accelerometer, altimeter, and terrestrial magnetism sensor) for the INS are further considered.

Hence, an advantage of the present invention is that unnecessary power consumption can be avoided and the system performance can be enhanced by not continuously operating the INS or operating the INS at a reduced operational level when a determination based on the reliability of the GNSS is considered.

The above-described methods according to the present invention can be implemented in hardware, firmware or as software or computer code that is stored in a recording medium such as a CD ROM, flash, EPROM, EEPROM, RAM, a floppy disk, thumbnail drive, a hard disk, or a magneto-optical disk or computer code downloaded over a network originally stored on a remote recording medium and then stored on a non-transitory medium and loaded into hardware such as a processor or microprocessor. The machine executable code stored on the non-transitory machine readable medium can be stored on a local recording medium, and loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitute hardware in the claimed invention. Finally, the claimed invention can include the use of a location information server comprising more than one server, such as a proxy server.

The program can be stored to an attachable storage device of the electronic device accessible via the communication network such as Internet, Intranet, LAN, WLAN, or SAN, or a communication network combining the networks. The storage device can access the electronic device through an external port.

A separate storage device in the communication network can access the portable electronic device. As set forth above, the positioning system combining the GNSS and the INS efficiently controls the sensor devices used for the INS. Therefore, unnecessary power consumption can be avoided and the system performance can be enhanced.

Accordingly, exemplary embodiments of the present invention provide an apparatus or a method as claimed in any one of the claims of this specification and a machine-readable storage storing such a program.

While the invention has been shown and described with reference to certain exemplary embodiments thereof, it will be understood by those skilled in the art that various changes in form and details may be made therein without departing from the spirit and scope of the invention as defined by the appended claims and their equivalents. For example, while the navigation system and the positioning system utilized herein are a Global Navigation Satellite System (GNSS) or a Global Positioning System (GPS), the claimed invention is not limited to the particular satellite systems.

What is claimed is:

1. A positioning method of an electronic device which comprises a Global Navigation Satellite System (GNSS) or Global Positioning System (GPS), and an Inertial Navigation System (INS), comprising:
receiving a satellite signal through the GNSS;
determining a location of the electronic device based on the satellite signal;
determining a reliability of location information of the electronic device provided by the GNSS using at least one of satellite information of the satellite signal and location information based on the determined location of the electronic device;
determining an operational level of the INS using the reliability of the location information of the electronic device; and
compensating the location of the electronic device by operating the INS according to the determined operational level of the INS, wherein compensating further comprises: increasing an amount of power provided to at least one part of the INS responsive to detecting a reduction in the reliability of the location information.

2. The positioning method of claim 1, wherein the determining of the reliability of the location information of the electronic device provided by the GNSS comprises:
determining a first reliability by considering at least one of a number of visible satellites in the satellite information, a number of satellites used to locate the electronic device, a satellite signal receive strength, and satellite deployment information;
determining a second reliability by considering a velocity and a velocity change of the electronic device in the location information;
determining a third reliability by considering error information of the location of the electronic device in the location information;
determining a fourth reliability by considering a latitude, a longitude, an altitude, and changes of the latitude, the longitude, the altitude of the electronic device in the location information; and
determining a fifth reliability by combining at least one of the first reliability, the second reliability, the third reliability, and the fourth reliability.

3. The positioning method of claim 1, wherein the location information comprises at least one of a longitude, a latitude, an altitude, a movement direction, and a speed of the electronic device, and
the satellite information comprises at least one of a number of visible satellites, a satellite list used for the positioning, a satellite signal receive strength, satellite deployment information, Dilution of Precision (DOP) information indicating uniformity of the satellite deployment, and uncertainty or accuracy.

4. The positioning method of claim 1, wherein the determining of the operational level of the INS comprises:
determining a corresponding operational level of the INS by comparing the reliability of the location information of the GNSS and at least one threshold.

5. The positioning method of claim 1, wherein the operational level of the INS is divided into a plurality of operational levels based on at least one of a turning on/off status of a plurality of sensors of the INS and a sampling cycle of the plurality of sensors.

6. The positioning method of claim 1, wherein the operational level of the INS comprises:
a first level for turning off a sensor of the INS;
a second level for determining stop and movement;
a third level for determining rotation;
a fourth level for determining a rotation angle; and
a fifth level for determining the location information based on the INS.

7. The positioning method of claim 1, wherein the compensating of the location of the electronic device by operating the INS according to the determined operational level of the INS comprises:
determining third location data by combining first location data of the GNSS and second location data of the INS; and
determining the location of the electronic device based on the third location data.

8. A positioning apparatus which comprises a Global Navigation Satellite System (GNSS) or Global Positioning System (GPS), and an Inertial Navigation System (INS), comprising:
the GNSS configured to receive a satellite signal and determining a location of an electronic device based on the satellite signal;
a GNSS information analyzer configured to determine a reliability of location information provided by the GNSS using at least one of satellite information of the satellite signal and location information based on the determined location of the electronic device;
an INS combination determiner configured to determine an operational level of the INS using the reliability of the location information of the electronic device; and
a sensor information receiver configured to compensate the location of the electronic device by operating the INS according to the determined operational level of the INS, wherein configured to compensate further comprises: configured to increase an amount of power provided to at least one art of the INS responsive to detecting a reduction in the reliability of the location information.

9. The positioning apparatus of claim 8, wherein the GNSS information analyzer determines a first reliability by considering at least one of a number of visible satellites in the satellite information, a number of satellites used to locate the electronic device, a satellite signal receive strength, and satellite deployment information,
determines a second reliability by considering a velocity and a velocity change of the electronic device in the location information,
determines a third reliability by considering error information of the location of the electronic device in the location information,
determines a fourth reliability by considering a latitude, a longitude, an altitude, and changes of the latitude, the longitude, the altitude of the electronic device in the location information, and
determines a fifth reliability by combining at least one of the first reliability, the second reliability, the third reliability, and the fourth reliability.

10. The positioning apparatus of claim 9, wherein the location information comprises at least one of a longitude, a latitude, an altitude, a movement direction, and a speed of the electronic device, and the satellite information comprises at least one of a number of visible satellites, a satellite list used for the positioning, a satellite signal receive strength, satellite deployment information, Dilution of Precision (DOP) information indicating uniformity of the satellite deployment, and uncertainty or accuracy.

11. The positioning apparatus of claim 8, wherein the INS combination determiner determines a corresponding operational level of the INS by comparing the reliability of the location information of the GNSS and at least one threshold.

12. The positioning apparatus of claim 8, wherein the operational level of the INS is divided into a plurality of operational levels based on at least one of a turning on/off status of a plurality of sensors of the INS and a sampling cycle of the plurality of sensors.

13. The positioning apparatus of claim 8, wherein the operational level of the INS comprises:
a first level for turning off a sensor of the INS;
a second level for determining stop and movement;
a third level for determining rotation;
a fourth level for determining a rotation angle; and
a fifth level for determining the location information based on the INS.

14. The positioning apparatus of claim 8, wherein the sensor information receiver determines third location data by combining first location data of the GNSS and second location data of the INS, and determines the location of the electronic device based on the third location data.

15. An electronic device comprising:
a Global Navigation Satellite System (GNSS) or Global Positioning System (GPS);
an Inertial Navigation System (INS);
one or more processors;
a memory; and
one or more programs stored in the memory and executable by the one or more processors, wherein the program comprises at least one instruction that when executed by the one or more processors, causes the one or more processors to perform operations comprising receiving a satellite signal through the GNSS, determining a location of the electronic device based on the satellite signal, determining a reliability of location information of the electronic device provided by the GNSS using at least one of satellite information of the satellite signal and location information based on the determined location of the electronic device, determining an operational level of the INS using the reliability of the location information of the electronic device, and compensating the location of the electronic device by operating the INS according to the determined operational level of the INS, wherein compensating further comprises: increasing an amount of power provided to at least one part of the INS responsive to detecting a reduction in the reliability of the location information.

16. The electronic device of claim 15, wherein the program comprises another one or more instructions that when executed by the one or more processors, causes the one or more processors to perform operations comprising determining a first reliability by considering at least one of a number of visible satellites in the satellite information, a number of satellites used to locate the electronic device, a satellite signal receive strength, and satellite deployment information, determining a second reliability by considering a velocity and a velocity change of the electronic device in the location information, determining a third reliability by considering error information of the location of the electronic device in the location information, determining a fourth reliability by considering a latitude, a longitude, an altitude, and changes of the latitude, the longitude, the altitude of the electronic device in the location information, and determining a fifth reliability by combining at least one of the first reliability, the second reliability, the third reliability, and the fourth reliability.

17. The electronic device of claim 15, wherein the location information comprises at least one of a longitude, a latitude, an altitude, a movement direction, and a speed of the electronic device, and
the satellite information comprises at least one of a number of visible satellites, a satellite list used for the positioning, a satellite signal receive strength, satellite deployment information, Dilution of Precision (DOP) information indicating uniformity of the satellite deployment, and uncertainty or accuracy.

18. The electronic device of claim 15, wherein determining the operational level of the INS comprises comparing the reliability of the location information of the GNSS and at least one threshold.

19. The electronic device of claim 15, wherein the operational level of the INS is divided into a plurality of operational levels based on at least one of a turning on/off status of a plurality of sensors of the INS and a sampling cycle of the plurality of sensors.

20. The electronic device of claim 15, wherein the operational level of the INS comprises:
a first level for turning off a sensor of the INS;
a second level for determining stop and movement;
a third level for determining rotation;
a fourth level for determining a rotation angle; and
a fifth level for determining the location information based on the INS.

21. The electronic device of claim 15, wherein the compensating of the location of the electronic device by operating the INS according to the determined operational level of the INS comprises:
determining third location data by combining first location data of the GNSS and second location data of the INS; and
determining the location of the electronic device based on the third location data.

22. The electronic device of claim 15, wherein determining a reliability comprises:
determining whether the reliability exceeds a first threshold;
determining whether the reliability exceeds a second threshold higher than the first threshold; and
wherein increasing an amount of power provided to at least one part of the INS responsive to detecting a reduction in the reliability of the location information further comprises:
the at least the part of the INS uses a first level of power if the reliability does not exceed the first threshold;
the at least the part of the INS uses a second level of power if the reliability exceeds the first threshold but does not exceed the second threshold, wherein the first level of power is higher than the second level of power; and
the at least the part of the INS uses a third level of power if the reliability exceeds the second threshold, wherein the second level of power is higher than the second level of power.

* * * * *

UNITED STATES PATENT AND TRADEMARK OFFICE
CERTIFICATE OF CORRECTION

PATENT NO.       : 9,268,026 B2                                  Page 1 of 1
APPLICATION NO.  : 13/766039
DATED            : February 23, 2016
INVENTOR(S)      : Gye-Joong Shin It is certified that error appears in the above-identified patent and that said Letters Patent is hereby corrected as shown below:

Column 16, Claim 8, Line 43 should read as follows:
--...least one part of...--

Column 18, Claim 22, Line 64 should read as follows:
--...first level of power...--

Signed and Sealed this
Third Day of May, 2016

Michelle K. Lee
*Director of the United States Patent and Trademark Office*